J. D. COPLEN.
IRRIGATING PLANTER AND CULTIVATOR.
APPLICATION FILED OCT. 28, 1909.
952,607.
Patented Mar. 22, 1910.
3 SHEETS—SHEET 1.
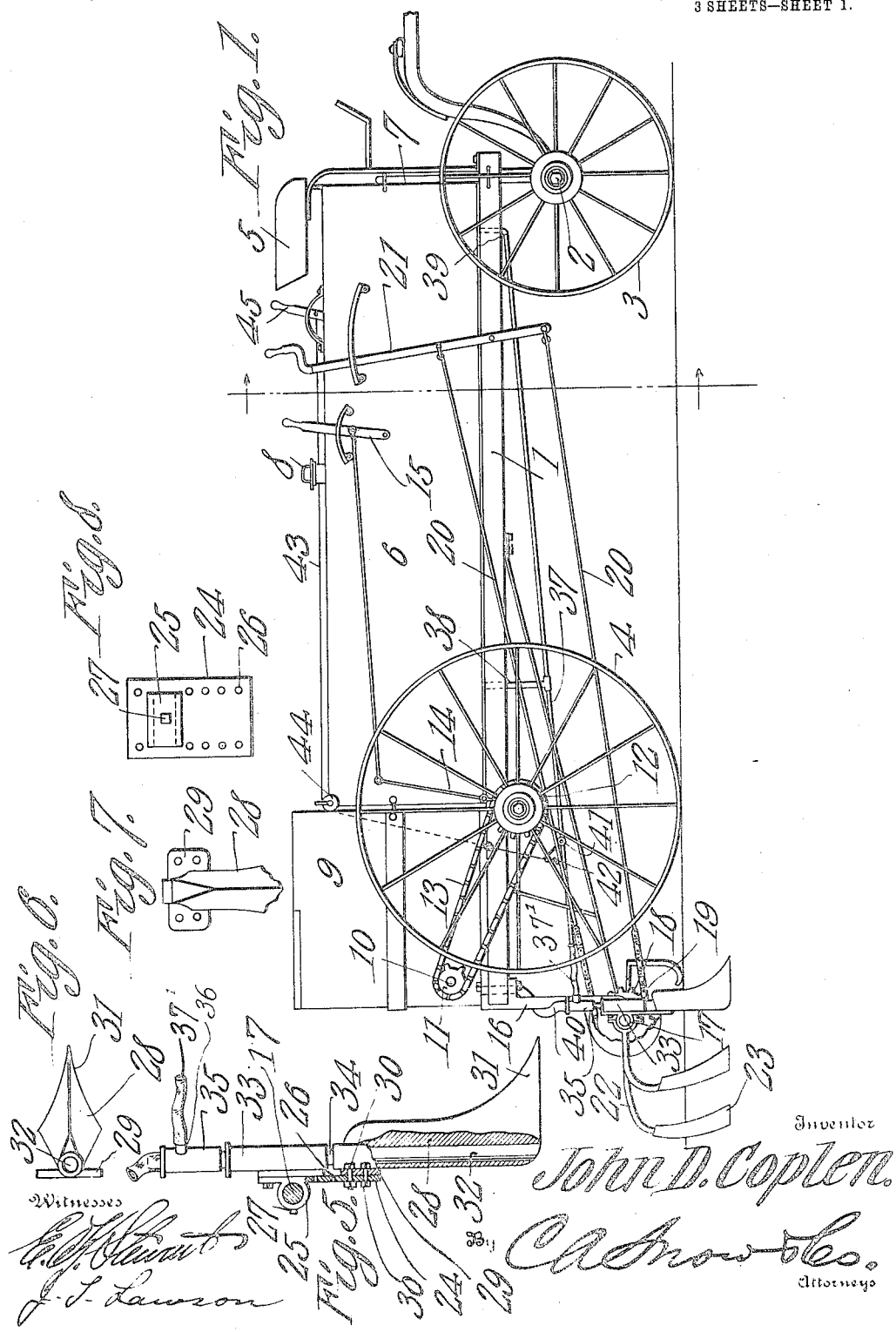

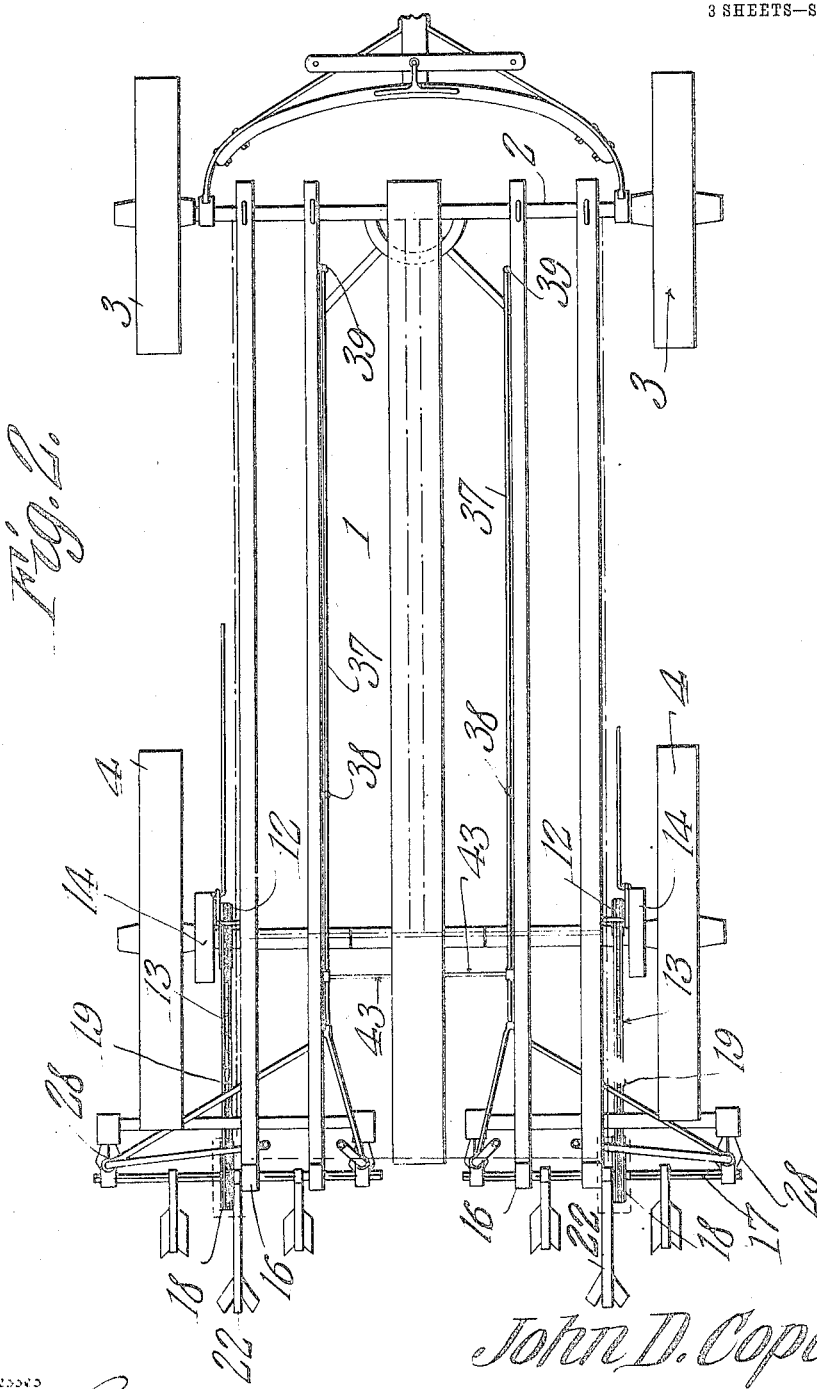

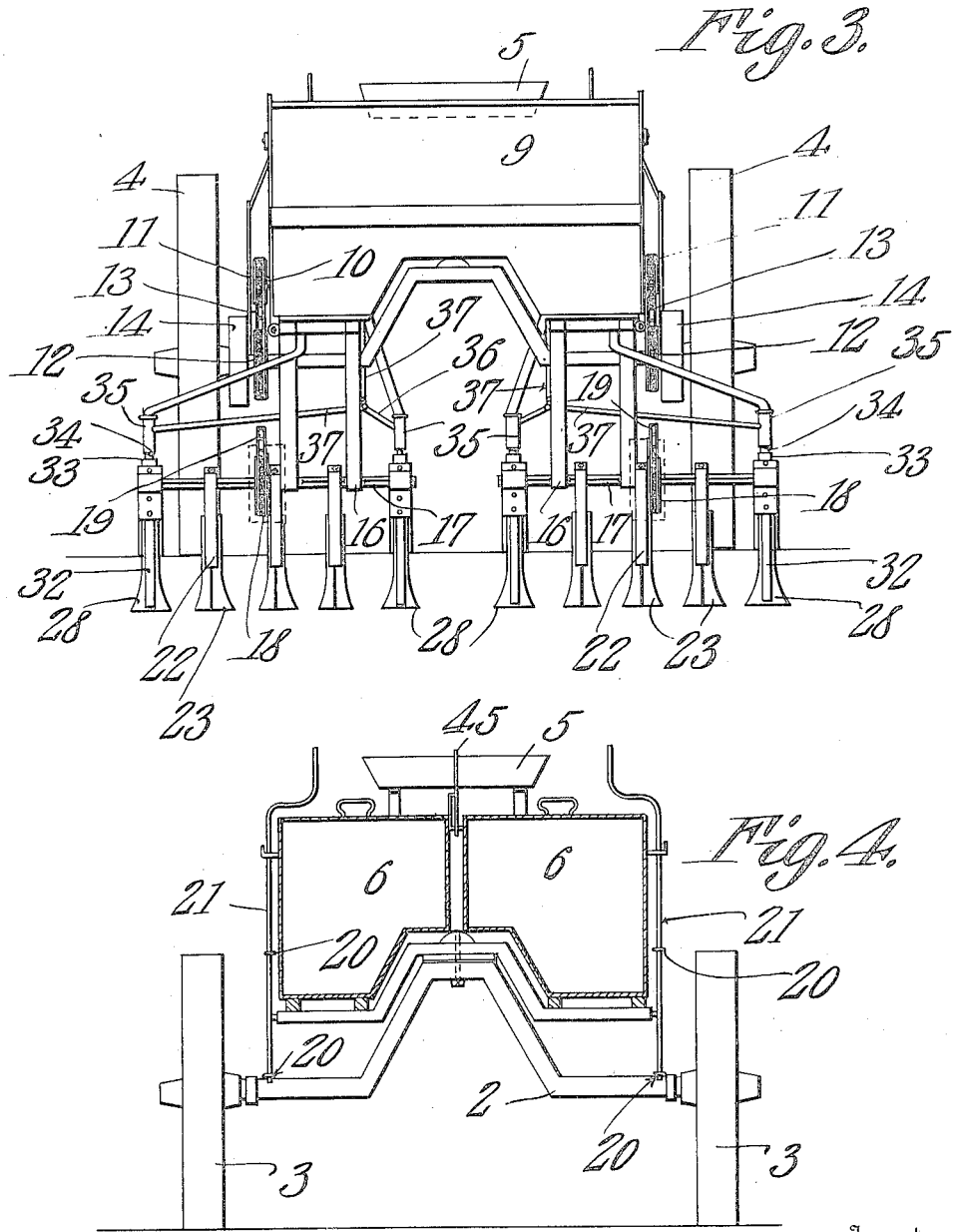

UNITED STATES PATENT OFFICE.

JOHN D. COPLEN, OF GLOBE, ARIZONA TERRITORY.

IRRIGATING PLANTER AND CULTIVATOR.

952,607.  Specification of Letters Patent.  Patented Mar. 22, 1910.

Application filed October 28, 1909. Serial No. 525,107.

*To all whom it may concern:*

Be it known that I, JOHN D. COPLEN, a citizen of the United States, residing at Globe, in the county of Gila and Territory of Arizona, have invented a new and useful Irrigating Planter and Cultivator, of which the following is a specification.

This invention has relation to irrigators, seed planters, and cultivators and is especially adapted to be used upon soils requiring irrigation and it consists in the novel construction and arrangement of its parts as hereinafter shown and described.

In arid regions it is the practice to spread water over the surface of the soil before the seed is planted, but this method is objectionable for the reason that it is attended with effects liable to retard the sprouting of the seed and subsequent growth of the plants.
In hot climates the rays of the sun cause more or less scalding while in cold arid sections, particularly where water is taken from mountain streams, the chill is very detrimental to vegetable growth and in all cases the submerging of the land always results in hardening or baking of the surface of the soil. Under this practice irrigation is seldom resorted to until after the plants have grown to considerable height above the ground.

One of the objects of the present invention is to provide a planter which will deposit water beneath the surface of the soil at the time that the seed is planted and thus the moisture is retained in the soil and the surface is not flooded and subsequently baked as pointed out, and the water is protected to a great extent against evaporation. The moisture thus conserved moistens the sprouting seed.

Another important object of the present invention is to provide an implement which may be used as a combined irrigator and cultivator and thus water may be applied to the sub-soil all the time that the crop is cultivated. The cultivating elements of the implement are not likely to be used while planting but will be useful in nearly all cases while irrigating growing plants.
With these and other objects in view the machine includes a wheel mounted frame upon which is supported one or more water tanks. A seed hopper is also mounted upon the frame and may be provided with any suitable form of seed dropping mechanism which is operatively connected with one of the supporting wheels of the frame. Shafts are pivotally mounted at the rear portion of the said frame and means is provided for partially rotating the said shafts. Standards may be carried by the said shafts upon which are cultivator teeth. Furrow openers are located at the ends of the shafts and seed and water-conveying pipes extend from the hopper and the tanks, respectively, to the said furrow openers. Means is provided for regulating the flow of water and also interrupting the same.

In the accompanying drawings,—Figure 1 is a side elevation of the machine. Fig. 2 is a top plan view of the wheel-mounted frame with the tanks and feed hopper removed. Fig. 3 is a rear end elevation of the machine. Fig. 4 is a transverse sectional view of the machine cut on the dotted line shown in Fig. 1. Fig. 5 is a detail side elevation of one of the furrow openers with parts in section. Fig. 6 is a top plan view of one of the furrow openers. Fig. 7 is a front elevation of the upper portion of one of the furrow openers. Fig. 8 is an elevation of a plate used as a support for the furrow openers.

The machine includes a frame or bed 1 which is mounted at its forward end upon an axle 2 supported upon wheels 3 and mounted at its rear portion upon traction wheels 4. An operator's seat 5 is mounted upon the forward portion of the frame 1 and the intermediate portion of the said frame 1 is arched transversely as best illustrated in Figs. 3 and 4 of the drawings. Tanks 6 are located upon the forward portions of the frame 1 and are held against lateral movement by means of stakes 7 supported at their lower ends by any suitable means upon the said frame 1. The tanks 6 are provided with inlets 8. A seed-box 9 is mounted upon the rear portion of the frame 1 and is provided with a rotatable shaft 10 which is adapted to operate any preferred form of seed dropping mechanism (not shown) located in the said box or hopper 9. A sprocket wheel 11 is fixed to the end of the shaft 10 and a sprocket wheel 12 is fixed to the side of one of the traction wheels 4. A sprocket chain 13 passes around the wheels 11 and 12 and is adapted to transmit rotary movement from the wheel 12 to the wheel 11 and shaft 10. Any suitable clutch mechanism indicated at 14 in Fig. 1 may be provided for causing the wheel 12 to rotate in unison with the wheel 4 or for permitting the said wheel 12 to remain at rest while the wheel 4 rotates. The said clutch mechanism is operatively connected with a lever mechanism 15 which is mounted upon one of the tanks 6. Brackets 16 depend from the rear end of the frame 1 and shafts 17 are journaled for rotation at the lower portions of the said brackets 16. The sprocket wheels 18 are fixed to the shafts 17 and sprocket chains 19 pass around the rear portions of the said wheels 18. Rods 20 connect the opposite ends of the chain 19 with an operating lever 21 at opposite sides of the fulcrum point of said lever. The lever 21 is fulcrumed to the forward portion of the frame 1 and its power end is within reach of one occupying the seat 5. Standards 22 are fixed to the intermediate portions of the shafts 17 and cultivator teeth 23 are fixed to the lower rear ends of the said standards 22.

Plates 24 are provided with sleeves 25 and at their lower portions with series of perforations 26. The sleeves 25 are adapted to snugly receive the end portions of the shafts 17 and set screws 27 or other securing means may be provided for fixing the said sleeves with relation to the shafts.

Furrow openers 28 are provided at their upper rear sides with laterally disposed lugs 29 which are adapted to be adjustably secured upon the lower portions of the plate 24 by means of bolts 30 which pass transversely through the said lugs and the lower portions of the said plate. The lower portions of the furrow openers 28 are pointed as at 31 and are forwardly disposed. The said furrow openers at their rear portions are provided with vertically disposed perforations or passages 32. The perforations 32 form passages or channels for the water and seed as will be hereinafter described. Sleeves 33 are fixed to the upper portions of the plate 24 and pipes 34 pass through the said sleeves and at their lower ends enter the upper portions of the passages 32 through the furrow openers 28. Fittings 35 are located at the upper ends of the pipes 34.

Pipe branches 36 connect with the sides of the fittings 35 and also connect with water pipes 37 which in turn are connected by means of branches 38 and 39 with the bottoms of the tanks 6 in the vicinity of the front and rear ends, respectively, thereof. Flexible hose 40 connect at their lower ends with the upper ends of the fittings 35 and at their upper ends with the outlet of the hopper 9. The pipes 37 are provided with valves 41 which are normally held in closed position by means of springs 42. Cables 43 are attached at their rear ends to the free ends of the stems of the valves 41 and pass over pulleys 44 journaled for rotation at the rear ends of the tanks 6 and connect at their forward ends to handle levers 45 fulcrumed in the vicinity of the operating seat 5.

By reason of such an assemblage of parts it will be seen that an operator may swing the lever 21 whereby the rods 20 will be moved longitudinally and the chains 19 carried around the peripheries of the wheels 18. Thus the shafts 17 may be rotated and the cultivator teeth 23 (when the implement is equipped with them) projected into the soil or lifted above the same. The furrow openers 28 will be moved in a similar manner. When the furrow openers are operating in the soil, in the act of planting or irrigating, the levers 45 may be moved so that the valves 41 are open against the tension of the springs 42. Thus water is permitted to flow from the tank 6 through the pipe sections 38 and 39 into the pipe section 37 past the valves 41 and through the flexible pipe section 37' into the fittings 35 thence through pipe 34 and the passage 32 to the ground. At the same time the lever 15 may be so swung as to cause the clutch mechanism 14 to transmit rotary movement from the wheel 12 to the shaft 10 as above described. Consequently seed is passed from the hopper 9 through the flexible tubes 40 to the fittings 35 where it is taken up by the water and carried down through the pipes 34 and passages 32 in the furrow openers 28 and is deposited in the soil below the surface of the same. Thus both the water and the seed are deposited below the surface of the soil and in the same opening made by the furrow openers 28. Consequently the seed are embedded in the moist earth and inasmuch as the moisture is below the surface it is protected against evaporation. As above stated the cultivator teeth 23 may be used upon the implement at planting time if desired. After the seed sprouts and the plants begin to grow the implement may be used as a combined irrigator and cultivator by attaching the cultivator standards and teeth and disconnecting the operating parts of the seed hopper from the operating parts of the implement frame.

Having described the invention, what I claim as new and desire to secure by Letters Patent is:

A machine comprising a wheel mounted frame, a tank located thereon, brackets depending from the rear portion of the frame, a shaft journaled for rotation in the brackets, cultivator standards fixed to the shaft, a plate fixed to the shaft, a furrow opener adjustably mounted upon said plate and having a passage leading therethrough, means for rotating the shaft and a pipe connection between the tank and the passage through the furrow opener.

In testimony that I claim the foregoing as my own, I have hereto affixed my signature in the presence of two witnesses.

JOHN D. COPLEN.

Witnesses:
WILLIAM MILLER,
C. E. DOYLE.